United States Patent [19]
Pettigrew et al.

[11] 3,780,780
[45] Dec. 25, 1973

[54] ROTARY CUTTING BLADE

[76] Inventors: David D. Pettigrew, 11300 124th Ave. North, Largo, Fla. 33540; Richard Vaughn, Highway 81-35, Dilley Hotel, Dilley, Tex. 78071

[22] Filed: Oct. 2, 1972

[21] Appl. No.: 293,839

[52] U.S. Cl. .................... 144/238, 83/698, 144/218
[51] Int. Cl. ............................................ B27b 33/00
[58] Field of Search .................... 144/218, 222, 228, 144/230; 83/666, 698, 838; 29/104

[56] References Cited
UNITED STATES PATENTS

| | | | |
|---|---|---|---|
| 3,590,893 | 7/1971 | Burkiewicz | 83/838 |
| 2,683,476 | 7/1954 | Courcier | 144/238 |
| 2,665,722 | 1/1954 | Edgemond, Jr. | 144/238 |
| 1,903,002 | 3/1933 | Johnson | 144/222 X |
| 628,810 | 9/1901 | Parks | 144/238 |

*Primary Examiner*—Andrew R. Juhasz
*Assistant Examiner*—W. D. Bray
*Attorney*—Stefan M. Stein et al.

[57] ABSTRACT

An adjustable rotary dado blade assembly of the type designed to be mounted for relatively high speed rotation on an arbor or the like and including mounting means in the form of at least two cam assemblies movably engaging one another and the blade itself so as to position the blade in engagement with a positioning surface, the configuration of which defines the angular orientation of the plane of the blade relative to the axis of rotation of the blade. The blade means includes a disc having a plurality of cutting elements formed about the periphery in unequal spaced relation to one another and located so as to position the cutting edge of the cutting elements at different radial distances from the center of the blade disc so as to provide a substantially level dado.

13 Claims, 21 Drawing Figures

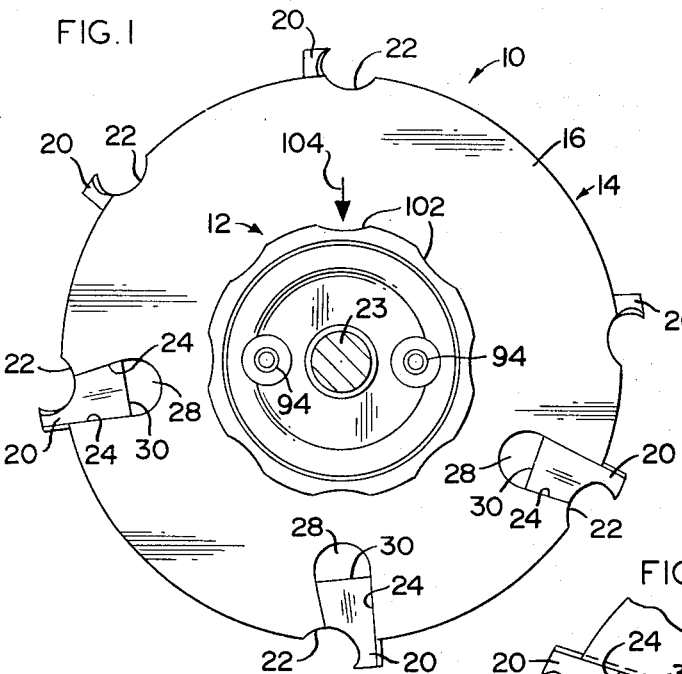
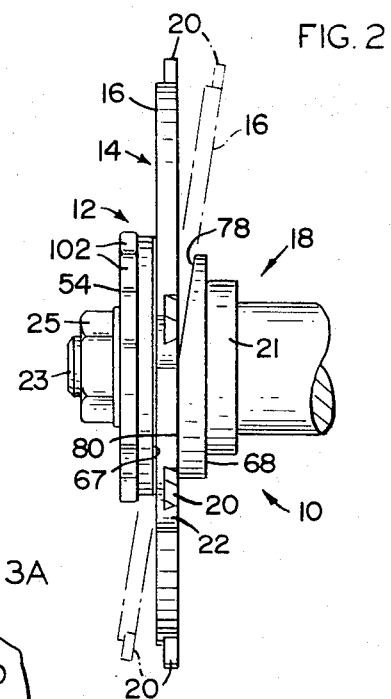

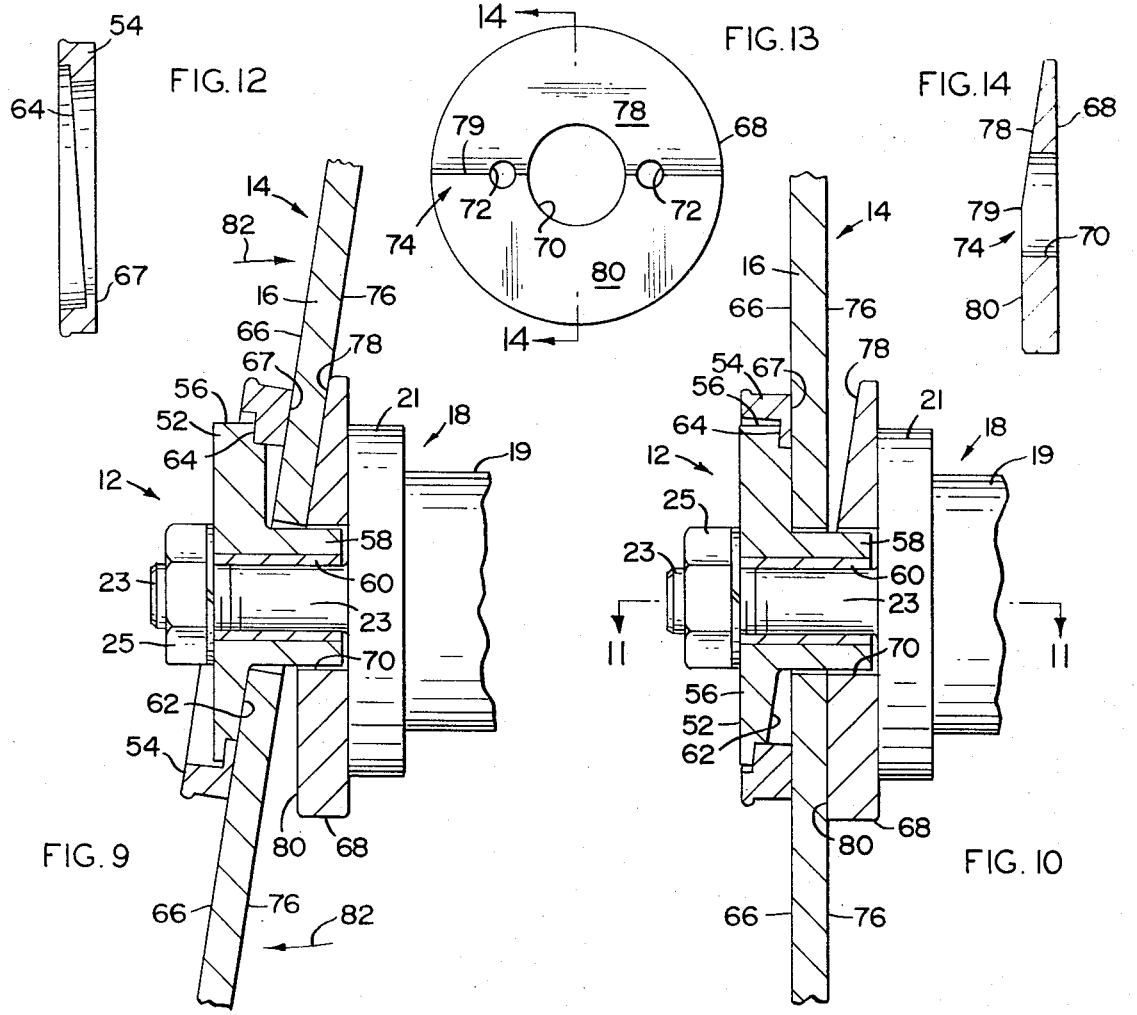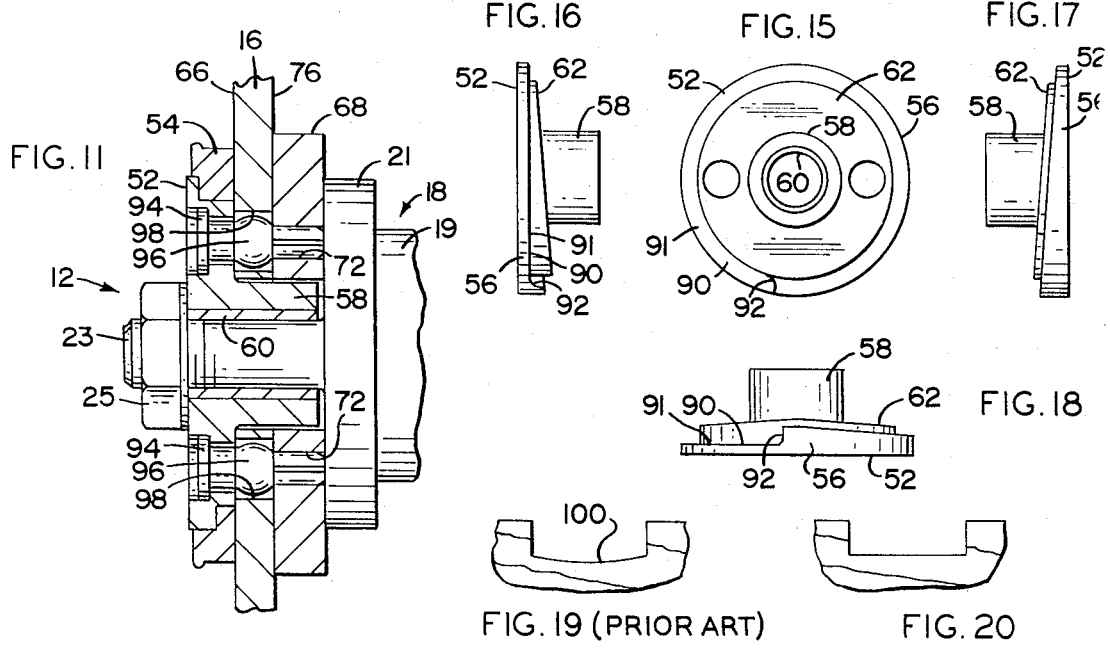

ROTARY CUTTING BLADE

BACKGROUND OF THE INVENTION

1. Field of the Invention

This invention relates to a rotary blade assembly of the dado blade type having a mounting means for attaching it to an arbor wherein the mounting means incudes cam members movably adjustable relative to one another and the blade itself so as to selectively vary the angular orientation of the plane of the blade relative to its axis of rotation and thereby the width of the dato cut.

2. Description of the Prior Art

In the woodworking and carpentry industry the use of a dado blade for forming slots or grooves of varying widths have been known for many years. The structure of such blades includes relatively complex and expensive structures comprising a pluraltiy of blades permanently affixed at varying angles relative to the axis of rotation so as to have the capability of forming specifically configured or dimensioned slots or dados. While these prior art structures vary greatly in design, generally the structures comprise one or more blade arrangled either singly or in side-by-side relationship at predetermined intervals and are generally mounted on arbors or like elements for relatively high speed rotation. The structures themselves generally comprise a disc or discs, depending upon the number of blades utilized, wherein various cutting elements are mounted either integrally or by various fastening means about the periphery of the various discs.

A review of the prior art also reveals that it is quite common to determine the width of cut by arranging the blade at a predetermined angular orientation to the axis of rotation. Accordingly, the effective width of the cut will be approximately the width of the path through which the angularly oriented blade passes upon rotation. The various cutting elements are generally located at equally spaced distances from one another and equally distant from the center of the blade. This particular type structure commonly produces a curved or beveled "floor" of the dado or groove thus formed. In close tolerance or precision work, this is of course highly undesirable since any object fitted within the groove thus formed is not completely flushed with the base or floor of the groove.

Another obvious problem associated with the use and structure of conventional dado blades is their lack of versatility in establishing the desired dimension and in particular, the desired width of the dado cut or groove.

Various prior art structures attempting to provide an adjustable dado blade for the purposes of adding versatility in the area set forth above are shown in the U. S. Pat. Nos. 588,082 to Perkins and 384,248 to Fox. Generally Perkins discloses a dado cutter whereby the device disclosed is adjustable in that a plurality of blades are movable towards and away from one another. Fox discloses a dado cutter wherein the various blades may be adjusted relative to one another to adjust the desired size cut generally similar to the concept of Perkins.

A review of these references as well as many other prior art devices makes obvious the fact that there is a need in the cutting industry for an efficient, dado structure of simple design wherein the blade assembly is capable of long life, low maintenance and initial purchase cost and high versatility in that its design includes an adjustable features whereby dimension of the dado cut being formed may be predetermined and pre-selected.

SUMMARY OF THE INVENTION

This invention relates to a rotary cutting blade assembly capable of forming dado cuts of varying preselected widths wherein the dado formed has a substantially flat or level base. More particularly, the mounting means on which the blade means of the assembly is fixedly attached to a rotatable arbor or the like includes various structural elements which allows the angular orientation of the plane of the blade means to be varied relative to the axis of rotation of the blade means.

The dado blade assembly comprises a blade means which include a substantially flat supporting disc on which a plurality of cutting elements or teeth are mounted. The cutting elements are arranged adjacent to the periphery of the disc and are oriented in spaced relationship to one another. Furthermore, in order to accomplish or form a dado cut of precise dimensions and particularly including a flat base, each of the cutting edges or surfaces of the cutting elements are arranged at different radially distances from the center of the disc. The spacing between the cutting element and the number of cutting elements are dependent upon the particular application for which the blade assembly is to be used.

Each of the cutting elements are attached to the disc itself by a cutting element connecting means. This connecting means, in one embodiment of the present invention, may take the form of a dovetail slot or groove formed adjacent the periphery of the disc and configured to correspond to the shape of the cutting element itself. More specifically, each of the elements are wider at its base or inner extremity that it is at its outer extremity adjacent the cutting portion of the cutting element. Since the slot is similarly formed, the element is essentially wedged tightly within the slot. A supporting element in the form of a washer is shrunk fitted within the slot at its base and frictionally engages the inner extremity of the element in supporting relation thereto.

Another embodiment of the present invention comprises the supporting disc being made of aluminum material and the cutting means being in the form of either an opened or closed ring maintained within a groove concentrically arranged to the center of the disc. The ring supportingly engages each of the cutting elements adjacent their inner extremity. The engagement between the ring and the elements is by means of a slot or groove configured to correspond to the width of the ring located adjacent the inner extremity or alternately the extremity of the cutting element merely rests on the outer peripheral edge of the supporting ring. The groove or channel in which the supporting ring is located is configured in a predetermined manner dependent upon whether or not the supporting ring is non-continuous as in a snap ring or whether the ring is endless or continuous. In the latter embodiment, simple connectors in the form of rivets or the like may attach the supporting ring to the groove or directly to the face of the disc as desired. When the supporting disc is made of aluminum the supporting ring is formed from a harder material such as steel or the like thereby lending support to the cutting element. This added support provided by a steel ring is important due to the fact that aluminum is relatively soft.

The adjustable mounting means of the blade assembly comprises cam means in the form of two cam members each having a generally circular configuration and having annular camming surfaces arranged adjacent to each of the members outer periphery. Each of the members are connected so as to be movable relative to each other wherein at least one of the cam members is rotatably mounted relative to both the other of the two cam members and the blade means itself. A first of the two cam members comprises a hub member having an integrally formed, outwardly extending hub or finger on which the supporting disc is fixedly mounted. This hub member in turn is centrally apertured and is designed to fit on the arbor and be secured tightly thereabout for rapid rotation of the supporting disc. A positioning means in the form of a disc is also mounted on the hub member on the opposite side of the supporting disc, by means of a central aperture surrounding the hub of the hub member. The positioning means further includes a positioning surface specifically configured and arranged to engage in partial supporting and positioning relation, the supporting disc of the blade. The supporting surface comprises at least two portions which are angularly oriented relative to one another wherein the particular surface portion forced into engagement with the disc defines the angular orientation of the blade means or supporting disc relative to its axis of rotation.

With specific reference to the individual cam members, at least one of these members have a cutaway portion formed adjacent to and as an extension of its normally configured cam surface. This cutaway portion is utilized to compensate for the high side of the cam surface of the opposing and cooperating cam member. This cutaway portion allows this high side of the opposing cam surface to ride freely or float in spaced relation to the surface defining the cutaway portion as it continues to travel in the plane defined by the cam surface adjacent to the cutaway portion on the cam member which is formed. This prevents binding or locking of the two cam members as they rotate relative to one another.

A further structural feature of the invention comprises the blade connecting means utlized to secure the blade in a sandwiched like relation between the cam member comprising the hub member and the positioning means. In this relationship, the positioning means serves as a clamp member fixedly connecting, in a rotational sense, the supporting disc of the blade means to the hub member. However, in order to allow the "pivotal" adjustment of the supporting disc relative to the hub member, spherical portions are defined on the connectors which interconnect the hub, supporting disc and positioning means. This allows for a certain amount of play between the connectors and the supporting disc or blade means upon relative movement between the first and second cam members.

The ivention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which:

FIG. 1 is a plane view of the blade means and mounting assembly thereon of the present invention.

FIG. 2 is a side view of FIG. 1 shown in broken lines the operative position of the blade means.

FIG. 3 is another embodiment of the blade assembly including a cutting element connecting means in the form of a non-continuous ring.

FIG. 3A is a detailed view of another embodiment of the cutting element connecting means of the present invention.

FIG. 4 is a cross sectional view taken along lines 4—4 of FIG. 3 of the cutting element connecting means.

FIG. 5 is a cross sectional view taken along lines 5—5 of a cutting element.

FIG. 6 is a cross sectional view taken along lines 6—6 of FIG. 3.

FIG. 7 is a detailed view of a supporting ring which comprises a cutting element connecting means.

FIG. 8 is a cross sectional view taken along lines 8—8 of FIG. 7.

FIG. 9 is a cross sectional view of the mounting assembly defining the operative position of the blade means.

FIG. 10 is a partial cross sectional view of the mounting means defining the cutting blade means in one operative position.

FIG. 11 is a sectional view taken along lines 11—11 of FIG. 10.

FIG. 12 is a detailed sectional view of a cam member which is part of the present invention.

FIG. 13 is a front plane detailed view of the positioning means.

FIG. 14 is a sectional view taken along lines 14—14 of FIG. 13.

FIG. 15 is a front plane view of the hub member comprising one of the cam means.

FIG. 16 and 17 are opposite end views of the structure of FIG. 15.

FIG. 18 is a front end view of the hub member showing FIG. 15.

FIG. 19 is an end view showing the sectional configuration of a dado cut formed by a conventional or prior art dado blade assembly.

FIG. 20 is an end view showing the sectional configuration of a dado cut formed by the dado blade assembly of the present invention.

Similar reference characters refer to similar parts throughout the several views of the drawings.

DETAILED DESCRIPTION

The present invention relates to a rotary cutting blade assembly generally indicated as 10 in FIG. 1 wherein the blade is of the type known in the industry as a dado blade designed for making elongated groove-like cuts of predetermined widths. The blade assembly further includes a mounting means generally indicated as 12 designed to adjustably secure the blade means 14 including supporting disc plates 16 onto an arbor member 18 or like spindle assembly (FIG. 2).

More specifically, the blade means of the present invention includes a substantially flat circular supporting disc 16 having a pluraltiy of cutting elements 20 mounted on the disc in unequally spaced relation to one another about the disc periphery. As is well known in the art the cutting elements 20 may be mounted in a communicating relation to indentation or grooves 22 which serves to gather and remove chips from the object being cut.

Referring to FIGS. 3–8, the cutting elements 20 may be mounted on one or both faces of disc 16 by a cutting element connecting means. One embodiment of the present invention comprises this element connecting means as including a slot 24 formed in spaced relation about the periphery of the disc 16. This slot is configurated to have a dovetail shape defined by the fact that the base or inner portion of the slot 24 is wider than the outer extremity of the slot closest to the outer pheriphery of disc 16. This provides a wedging action on the body of the cutting element thereby making it impossible for the blade to be inadvertently removed through centrifical force as the disc 16 rotates rapidly. Supporting means for the cutting element may be in the form of a washer 28 friction fitted into the base of slot 24 and directly engaging the extremity of each cutting element 20 as at junction 30. This washer 28 adds support to the cutting element 20 and helps take up forces applied thereto when the cutting element is actually performing a cutting operation.

Another embodiment of the present invention comprises the cutting element connecting means being in the form of a ring, one embodiment of this ring being the form of a non-continuous ring structure 32 (FIG. 3). As pointed out the extremities 34 and 36 of ring 32 are positioned adjacent to one another and in spaced relationship to one another thereby allowing the installation and/or removal of the ring 32 to perform in the manner of a conventional snap ring. Referring to FIGS. 4 and 6, the ring 32 is mounted within an annularly shaped channel 38 formed in generally concentric relation to the center of disc 16. This channel is formed in communicating relation with slots 24 in which the cutting elements 20 are mounted. Again with reference to FIG. 6, individual grooves 40 may be formed in each of the cutting elements 20 and these grooves have a cross sectional configuration corresponding to the cross sectional configuration of the ring 32. It should be noted that at least one side wall 42 may be angularly oriented relative to the base 44 of slots 40 so as to help maintain the ring 32 therein. Channel 38 (FIG. 4) has an angular oriented side wall 46 corresponding to the contiguously positioned edge of ring 32. Another embodiment of the present invention may include the cutting elements 20 merely engaging the outer peripheral edge of the ring 32 rather than having slots 40 formed therein.

Another embodiment of the connecting means comprises a contiguous or non-interrupted connecting ring 48. This ring 48 would similarly be mounted in a annularly configured channel 40 but the ring 48 may be secured thereto by conventional connecting elements such as rivets 50. Accordingly, as shown in FIG. 8 the cross section of ring 48 may be rectangular rather than having at least one angularly oriented peripheral edge since the ring is maintained within an annular groove 40 by means of rivets 50.

Turning now mainly to FIGS. 9–18, the blade assembly of the present invention includes a mounting means generally indicated as 18 for adjustably mounting the blade means 14 including supporting disc 16 on the arbor assembly 18. The arbor comprises central shaft 19 having arbor flange 21 formed thereon and further having mounting shaft 23 integrally attached thereto. Shaft 23 may be threaded so as to allow arbor nut 25 to be fixedly attached thereto thereby mounting the blade means 14 onto the arbor assembly 18 for relatively high speed rotation. It should be pointed out that the arbor assembly 18 may take any applicable or conventional form and does not per se form a part of the present invention. Accordingly, this invention does contemplate various structural modifications not specifically herein disclosed which will allow the connecting of the blade means by virtue of the same structural elements which comprise the mounting means as described herein below.

The mounting assembly 12 includes cam means which is in the form of at least two cam members 52 and 54. The first cam member 52 is in the form of a hub member and includes a disc shaped portion 56 having a substantially circular configuration. Integrally attached thereto is the hub 58 extending outwardly therefrom. TH is hub may be centrally apertured so as to be mounted about shaft 23 of the arbor assembly 18. To facilitate this mounting a bearing sleeve 60 may be arranged between the shaft 23 and the interior surface of the central aperture of the hub member. The cam surface of cam member 52 is represented as 62 and is positioned in a semi-circular or arcuate shaped about the periphery of cam member 52. The second and cooperating cam member 54 is in the shape of a ring and includes a cam surface 64 also circularly shaped and positioned about the inner periphery of the member. As shown in FIGS. 9 and 10, hub member 52 is fixedly secured to shaft 23 by virtue of nut 25 being secured and forcing the entire mounting means inwardly towards the arbor flange 21. The cam means 54 however, is rotatably mounted relative to the cam member 52 and the supporting disc 16 and in movable engagement with surface 66 of the supporting disc 16. In this position the cam surfaces 62 and 64 of cam members 52 and 54 respectively, are in movable working engagement with one another. As will be explained in greater detail hereinafter the particular portions of the respective cam surfaces determine along with the positioning means 68 the orientation of the blade means or supporting disc 16 relative to its axis of rotation which corresponds to the central axis of shaft 23.

Referring to FIGS. 9, 10, 13 and 14, the positioning means 68 includes a disc-shaped structure having a centrally aperture 70 and smaller aperture 72 for securing the positioning means to the rest of the components comprising the mount assembly and the blade means itself. In particular the positioning means 68 is mounted on hub 58 by virtue of central aperture 70 such that it is mounted on the opposite side of disc 16 relative to the cam members and has a positioning surface generally indicate as 74 arranged in engagement with the surface 76 of disc 16. The surface 74 comprises at least two surface portions 78 and 80 which are angularly oriented relative to one another and which are separated by a pivot or hinge function line 79. The orientation of the plane of these surfaces relative to each other and the central axis of rotation of positioning means 68 determines the angular orientation of supporting disc 16 and accordingly, blade means 14 relative to its axis of rotation.

In operation, rotation of cam member 54 relative to cam member 52 and supporting disc 16 causes movable engagement between surface 66 and bearing surface 67 of the cam member 54. Relative rotation of these two members obviously causes movable engagement between the cam surfaces 62 and 64. FIG. 9 represents the high portions of cam surfaces 62 and 64 coming into working engagement with one another thereby forcing cam member 54 into a particular angular orientation which in turn forces disc 16 to pivot about junction 79 and be positioned against surface 78 thereby positioning it in a predetermined annular orientation relative to its axis of rotation. The tilting movement from the position shown in FIG. 10 to the position shown in FIG. 9 is indicated by directional arrows 82. The disc may assume any position between the positions defined by the surfaces 78 and 80. Accordingly, as shown in FIG. 10 disc 16 is located in its "upright" position when the low portion of cam surface 64 engages the high portion of cam surface 62 as shown.

Other structural features of the subject invention incude a cutaway portion (FIG. 16 and 18) indicated as 90 and initially defined and separated from cam surface 62 by angle cut 92. This cutaway portion is provided to prevent binding when the high portion of cooperating cam surface 64 passes beyond the high portion of cam surface 62. When rotating beyond this point, the high portion of surface 64 will be arranged in spaced, "floating" relationship to the cutaway portion and particularly, the surface 91 defined thereby.

Turning to FIG. 11 the hub member, disc 16 and positioning means 68 are all interconnected to one another by mens of connecting pins 94. These pins have a dimension sufficient to extend through each of the elements described and further include a spherical portion 96 designed to fit and movably engage apertures 98 within disc 16. This allows relative movement between the pins 94 and in particular the spherical portions 98 and the disc 16 itself. This movement is necessary to allow for the tilting action as the disc 16 passes from its upright position shown in FIG. 10 to its farthest angularly oriented position as shown in FIG. 9.

Other features of the subject invention includes each of the cutting elements or predetermined pairs of the cutting elements arranged in opposed relation to one another being positioned on equal radial distances from the center of disc 16. This provides the substantially level cut as represented in FIG. 20 rather than the beveled or arcuate cut shown by base 100 in FIG. 9 which is depicted as showing the prior art dado type cut formed by conventional or prior art dado type blade.

Other structural features of the subject invention include various finger engaging means 102 being located about the outer periphery of cam member 54 to facilitate its movement relative to the cam member 52 and blade 16. Accordingly, indicia 104 may be formed on the face of the disc 16 and/or on the periphery of member 54 adjacent the finger hole 102.

It will thus be seen that the objects made apparent from the preceding description, are efficiently attained and, since certain changes may be in made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, ad all statement of the scope of the invention which, as a matter of language, might be said to fall therebetween.

Now that the invention has been described, what is claimed is:

1. A rotary saw blade assembly of the type designed to be mounted on a rotating arbor, said assembly comprising: blade means including a support disc, a plurality of cutting elements arranged in predetermined spaced relation about the periphery of said disc, cutting element connecting means engaging said blade means and said cutting elements so as to interconnect the same; adjustable blade mounting means attached to said blade means for interconnecting said blade means to the arbor, said mounting means including cam means movably connected to said blade means, positioning means mounted adjacent to and in supporting engagement with said blade means, said positioning means including a blade orienting surface having a predetermined configuration and oriented in cooperative relation to both said cam means and said blade means, whereby positioning of said cam means relative to said blade and said positioning means serves to regulate the orientation of said blade relative to its axis of rotation, and means to connect said mounting assembly to said blade means.

2. A rotary blade assembly as in claim 1 wherein said cutting element connecting means comprises ring means engaging each of said cutting element in supporting relation thereto, an annular channel formed in said disc adjacent to the position of said cutting element whereby affixing of said ring means in said channel, position said ring in supporting relation to said cutting element.

3. A rotary blade assembly as in claim 2 wherein said support disc is formed at least in part from an aluminum material.

4. A rotary saw blade assembly as in claim 2 wherein said ring means is non-continuous, the cross section of said channel corresponding to the cross section of said ring means and including at least one angularly oriented side wall portion configured to prevent inadvertent removal of said ring from said disc.

5. A rotary saw blade assembly as in claim 1 wherein said cam means comprises at least two cam members connected to said blade means in movable engagement with one another, at least one of said members movably engaging said blade means and oriented relative to said other of said cam members and said blade means such that the angular orientation of said blade means relative to its axis of rotation is dependent upon the relative positioning of said two cam members.

6. A rotary blade assembly as in claim 5 wherein each of said cam members comprise a substantially circular configuration to include cooperatively engaging cam surfaces positioned substantially adjacent the peripheral surface of said respective cam members.

7. A rotary blade assembly as in claim 6 wherein at least one of said cam members comprises a cutaway portion formed adjacent to and in the path of said cam surface thereon, whereby at least a portion of said cam surface on the cooperating other of said two cam members is periodically maintained in spaced floating relation relative to said cutaway portion upon relative rotation of said two cam surfaces.

8. A rotary blade assembly as in claim 5 wherein said first of said two cam members comprises hub means, said blade disc fixedly attached thereto, a second of said cam members rotationally mounted on said hub means relative to both said first cam member and said blade means.

9. A rotary saw blade assembly as in claim 8 wherein said positioning means is fixedly connected to said hub member on the opposite side of said blade means relative to said cam means, said cam means and said positioning means interconnected in cooperative relation to one another, whereby rotation of said cam means causes positioning of said blade means in supported engagement relative to said positioning means.

10. A rotary blade as in claim 1 wherein said blade orienting surface includes at least one portion substantially angularly oriented to the axis of rotation of said blade.

11. A rotary blade assembly as in claim 1 wherein said orienting surface of said positioning means engages said blade means and is configured to determine the orientation of the plane of said blade relative to the axis of rotation of said blade, asid surface further including at least one portion and angularly oriented to the axis of rotation of said blade and at least a second portion substantially perpendicular to the axis of rotation of said blade, said blade orienting surface being positioned relative to both the blade means and the cam means such that positioning of said cam means defines the point of engagement between said blade means and said orienting surface and accordingly, the angular relation between the plane of the blade and its axis of rotation.

12. A rotary blade assembly as in claim 1 wherein said means for connecting the blade means to the mounting means comprises at least one connector, said connector including an outer surface engaging said blade means wherein said outer surface has a substantially spherical configuration.

13. A rotary blade assembly as in claim 1 wherein said cam means comprises indicia formed on its outer surface whereby selective positioning of said cam means is determined by cooperative indicia located on the blade assembly.

* * * * *

UNITED STATES PATENT OFFICE
CERTIFICATE OF CORRECTION

Patent No. 3,780,780  Dated December 25, 1973

Inventor(s) David D. Pettigrew et al.

It is certified that error appears in the above-identified patent and that said Letters Patent are hereby corrected as shown below:

Column 7, line 27, delete "mens" and insert -- means --.

Column 9, line 17, delete "asid" and insert -- said --.

Signed and sealed this 25th day of June 1974.

(SEAL)
Attest:

EDWARD M. FLETCHER, JR.
Attesting Officer

C. MARSHALL DANN
Commissioner of Patents